United States Patent

Hilbert

[11] 4,293,196
[45] Oct. 6, 1981

[54] OBJECTIVE LENS SYSTEM WITH ASPHERIC FRESNEL ELEMENTS

[75] Inventor: Robert S. Hilbert, La Canada, Calif.

[73] Assignee: Fantacia, Del Mar, Calif.

[21] Appl. No.: 65,994

[22] Filed: Aug. 13, 1979

[51] Int. Cl.³ .............................. G02B 3/04; G02B 3/08
[52] U.S. Cl. ...................................... 350/452; 350/432; 358/239
[58] Field of Search ............... 350/211, 125 NG, 189, 350/409, 432, 452; 358/239

[56] References Cited

U.S. PATENT DOCUMENTS

| | | | |
|---|---|---|---|
| 3,904,281 | 9/1975 | Jampolsky | 350/211 X |
| 3,909,525 | 9/1975 | Fagan | 350/211 X |
| 4,032,968 | 6/1977 | Miyoshi et al. | 358/239 X |
| 4,116,223 | 9/1978 | Vasilantone | 350/211 X |

*Primary Examiner*—John K. Corbin
*Assistant Examiner*—Scott J. Sugarman
*Attorney, Agent, or Firm*—Jackson, Jones & Price

[57] ABSTRACT

A high speed projection lens system particularly adaptable for a television projection system having a viewing screen and a video image forming surface is provided. The projection lens system includes a first thin meniscus lens element convex to the projection screen having an aspherical Fresnel type surface; a second thin meniscus lens element concave to the projection screen having an aspherical Fresnel type surface and a weak third thin aspherical meniscus lens element.

31 Claims, 25 Drawing Figures

FIG. 3
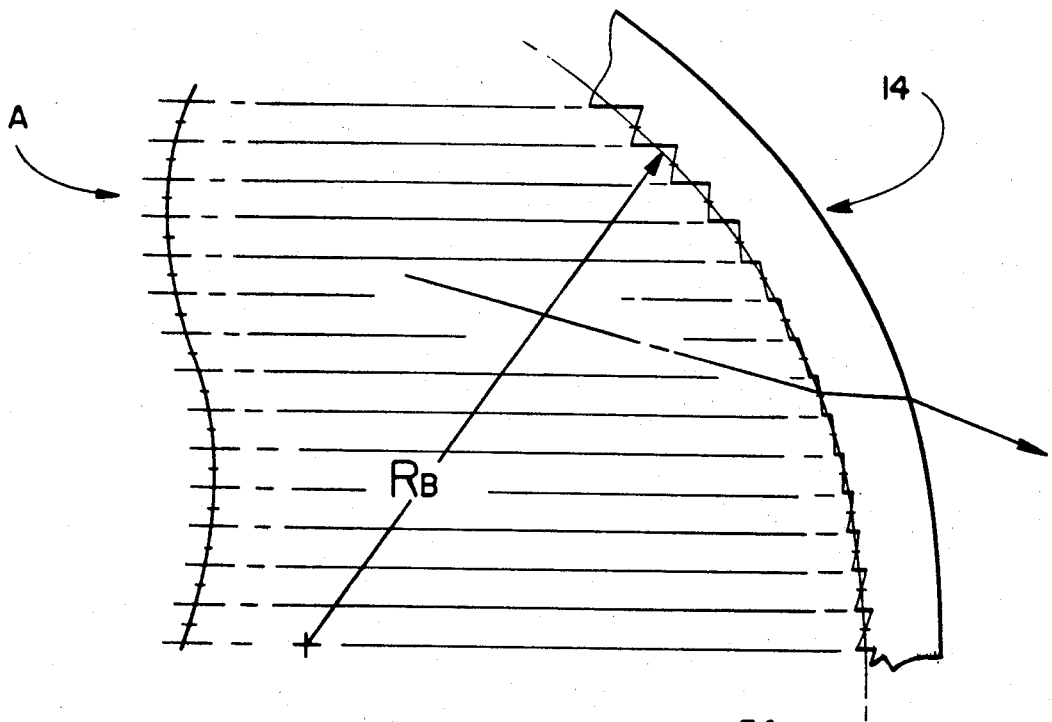
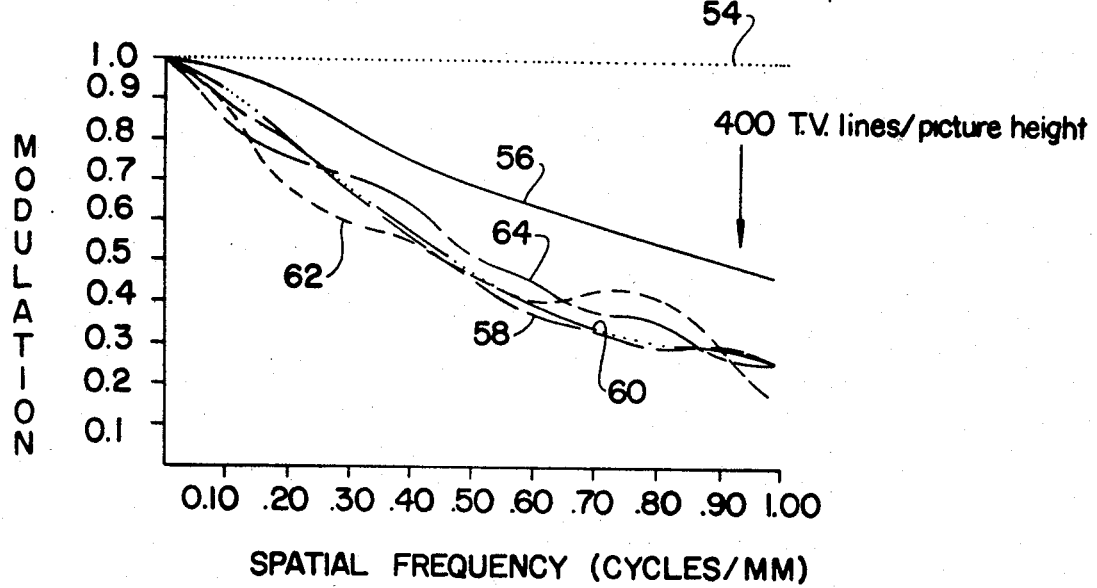
FIG. 7

TANGENTIAL

SAGITTAL

TANGENTIAL

SAGITTAL

TANGENTIAL

SAGITTAL

OBJECTIVE LENS SYSTEM WITH ASPHERIC FRESNEL ELEMENTS

BACKGROUND OF THE INVENTION

1. Field of the Invention

The present invention relates to a high speed, objective optical system of an economical construction and more particularly a multi-element thin objective system capable of providing video projection.

2. Description of the Prior Art

Since approximately the invention of television, attempts have been made to increase the size of the viewing picture. Simple glass magnification lenses were initially introduced to directly enlarge the size of the images on the cathode tube with the viewer observing the object side of the lens. Improvements in the resolution and size of cathode tubes made these early efforts obsolete.

Recently, various forms of television projection lens systems have been suggested. These T.V. projection systems have become popular particularly in commercial environments and to a lesser degree in individual residences. A prime problem for universal acceptance revolves about the factors of cost and image quality. The aberrations created in the magnification of the image during projection have required relatively expensive solutions.

A popular, but expensive, approach has been called a Schmidt system since it utilizes a Schmidt catadioptric objective system. The complimentary video system for the Schmidt system is specifically designed as an integral component and it is possible to drive its cathode tube to temperatures beyond those permitted on a normal television set to increase the illumination.

Recently, a triplet objective system with aspheric surfaces has been suggested. The lens elements of this system are formed from plastic and are relatively thick requiring special efforts during production with resulting costs.

Various types of curved Fresnel lenses for special optical applications have been suggested in the optical field and are cited of general interest such as U.S. Pat. Nos. 3,653,751; 3,572,903 and 3,523,721.

The prior art is still striving to provide a relatively inexpensive objective lens system that can be mounted on the average television set to provide a magnified projection of the video images onto a viewing screen with acceptable image resolution.

SUMMARY OF THE INVENTION

The present invention is directed to a high speed objective lens system that is particularly adaptable for a television projection system. The lens system includes from an object projection screen to a video image surface, a first thin meniscus lens element convex to the screen side having an aspherical Fresnel type surface on the screen side and a smooth radius surface toward the video image side; a second thin meniscus lens element concave to the screen side with a Fresnel type surface on the screen side, and a smooth radius surface toward the image side, and a third thin aspheric meniscus lens element convex toward the screen side. Each of the lens elements are manufactured from a plastic material such as methacrylate. The thickness of each lens, while varying from its thickness at the optical axis, is relatively uniformly thin and the effective diameter of each lens is at least twenty times greater than the lens' maximum thickness. By maintaining this thin configuration for each of the lenses, it is possible to commercially manufacture these lenses at a relatively low cost. The desired speed of the lens system is in the range of F/2.5 to F/0.7.

The preferred embodiments disclosed herein utilize one aspheric fresnel surface and one classical spherical surface on each of two or more airspaced elements. In one embodiment, three aspherical Fresnel type surfaces are provided on the projection screen side of the lens elements. In another embodiment of the present invention, the projection screen side of the third meniscus lens element has a smooth aspherical shape.

The present invention is designed for use with a video imaging system such as television and can be sold as a video projection system for incorporation with a residential television set. The video projection system includes the objective projection lens assembly which can be mounted in front of the television screen, appropriate electronics to invert the image on the television screen, and a projection screen which can be appropriately positioned relative to the lens assembly. The projected image magnification ratio achieved is approximately a factor of five while maintaining adequate illumination and image resolution with minimal distortion within the design field of view.

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

BRIEF DESCRIPTION OF THE DRAWINGS

FIG. 3 is an explanatory schematic view of a portion of the meniscus lens element with a Fresnel type aspherical surface;

FIG. 7 is a geometrical MTF curve for a third embodiment of the present invention;

DESCRIPTION OF THE PREFERRED EMBODIMENTS

The following description is provided to enable any person skilled in the optical and video field to make and use the invention and sets forth the best modes contemplated by the inventor of carrying out his invention.

Various modifications, however, will remain readily apparent to those skilled in the art since the generic principles of the present invention have been defined herein specifically to provide a relatively economical and easily manufactured optical video projection system for sale as an accessory to a television set or as a component in a video projection system.

Figure 1:
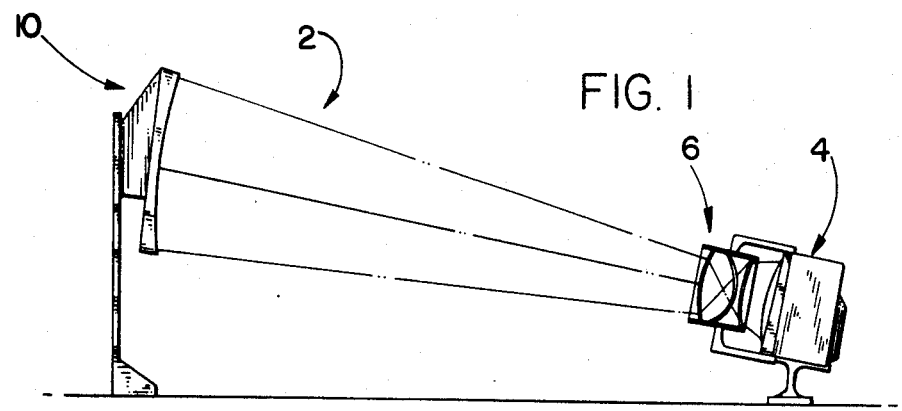
FIG. 1 is a schematic view of a television projection system of the present invention.

Referring to FIG. 1, a schematic video projection system 2 is disclosed. A television set 4 such as a 13 inch diagonal color television set that can be commercially purchased from numerous manufacturers can be utilized. While not shown a standard electronic accessory item is attached to the television set to invert the image formation on the screen. A high speed objective lens system 6 is mounted in front of and spaced from the image forming surface of the television set 4 by appropriate mounting brackets 8. A curved viewing screen 10 is located approximately eight feet from the television set 4. As can be readily appreciated, the schematic view of FIG. 1 is not drawn to scale. The diagonal of the viewing screen 10 is approximately 63 inches with a concave radius of approximately 130 inches. While a curved viewing screen 10 is disclosed, it should be appreciated that other geometrical shapes, such as flat, can be utilized with appropriate modification of the optics of the present invention.

An important feature of the present invention is to provide a relatively inexpensive objective lens system to permit the average consumer to purchase the same. Specially designed video projection systems are capable of providing a higher illumination level but only at a relatively prohibitive cost to the average consumer. The design goals of the present invention is to provide an acceptable image resolution at a relatively low cost. To achieve this goal, certain design constraints were assumed such as the necessity to utilize plastic molded lenses to permit a relatively inexpensive production of aspherical lenses capable of providing additional parameters to correct the aberrations that were believed to be intrinsic in the design. By providing relatively thin plastic lenses the design goal of efficient mass production is believed to be obtainable. It is also a goal of the present invention to provide a relatively high speed lens within the range of F/2.5 to F/0.7. Such a high speed lens is necessary to provide the maximum illumination to the projected image.

During the initial analysis of the lens design it became apparent that to achieve a television projection lens having the desired speed that the number of thin conventional plastic lens elements required while maintaining a minimal thickness would fall within the range of six to ten lens elements. The potential reflection loss for each surface of these lens elements plus the complexity of mounting the lenses would defeat the principle goal of the invention design. To eliminate this problem the use of a non-flat Fresnel type lens surface is utilized. The extreme curves utilized in the lens design created an initial concern as to reflection loss at high incidence angles. However, since the major percentage of each lens surface has less than a 45-degree incident angle the reflection loss was controlled to a tolerable level. In addition, it is within the parameters of the present invention to provide an anti-reflection coating such as magnesium fluoride on the non-Fresnel surfaces to thereby increase the transmission of light. By resorting to the Fresnel type surface a greater refracting power can be provided while still maintaining a relatively thin lens that can be molded on a commercial basis. The non-flat or curved base, aspheric Fresnel type of lens assists in the correction of coma and other aberrations which is not possible with a flat classic aspheric Fresnel lens. Preferably the Fresnel facet width is selected in an intermediate range between that of a very fine spacing, e.g. 0.005 inch and very coarse spacing, e.g. 0.10 inch.

The construction of the desired Fresnel type surface involves superimposing segmented sections of the slope of an aspherical curve, A, on a spherical base of a predetermined radius, RB. As can be seen from FIG. 3, an aspherical curve is segmented and each segmented portion is a refracting facet of the Fresnel type surface. Thus, these segmented slopes are superimposed on the lens face with the radius, RB, passing through each median point. As a result the locus of median points of the respective step facets form a non-planar configuration. A classical Fresnel surface would result for the case where, RB, was equal to infinity. As can be appreciated by an optical designer an approximation could be achieved with a single continuous surface to facilitate a molding process.

The resulting optical design includes the following characteristics of at least one Fresnel type surface on one lens element; two or more refractive meniscus lens elements that are capable of forming an image, one convex and one concave towards the projection screen; the lens elements are thin having approximately uniform thickness throughout the height of the lens, e.g. a thickness to diameter ratio of less than 1 to 20 and the Fresnel type base radius, RB, should be in the range of 0.53 to 20 times the diameter of its optical element.

Figure 2:
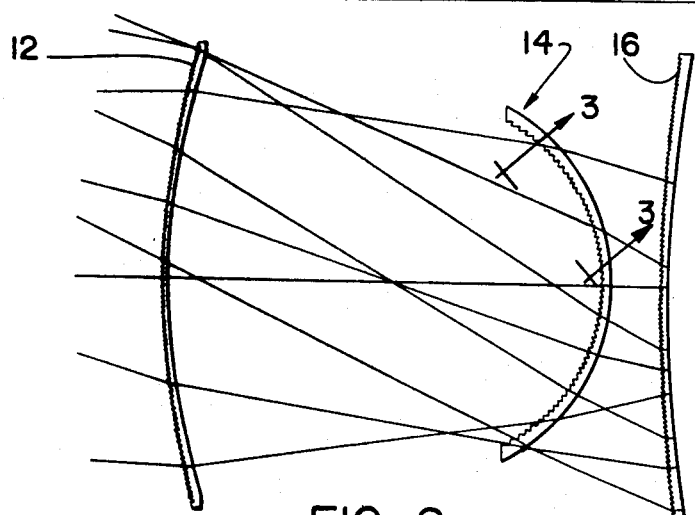
FIG. 2 is a schematic cross-sectional view of a first embodiment of the lens design.

Referring to FIG. 2, a first embodiment of the objective lens system 6 is disclosed. A first thin meniscus lens element 12 is convex to the projector screen. The traditional left or object side being defined herein as the side of the projection screen 10. The first surface has Fresnel type facets with aspherical slope superimposed on a non-flat base radius, RB. The base radius can be defined as the locus of the median point of each step or facet of the Fresnel type surface. The Fresnel type surface is provided to increase the refractive power of the lens while permitting correction of coma and other aberrations. The right side of lens element 12 is spherical and can be coated with an anti-reflection coating such as magnesium fluoride. This coating would increase the transmission of light through the lens element by reducing the degree of reflection loss across the bandwidth of visible light. A second thin meniscus lens element 14 is concave to the left side of FIG. 2. Again, the left side of lens element 14 has an aspherical Fresnel type surface on a non-flat base radius. An enlarged view of a portion of lens element 14 is schematically set forth in FIG. 3. The base radius, RB, is schematically disclosed as the locus of the medium point of each facet step of the Fresnel type surface. The specific aspherical equation and coefficients are set forth subsequently in Table 1 to derive curve A.

Finally, a third thin meniscus lens element 16 having a relatively weak power and convex to the left side completes the first lens system. Again the left side of lens element 16 has an aspherical Fresnel type surface. The right side of both lens elements 14 and 16 are smooth and could be coated with an anti-reflective material to improve the light transmission through the lens system.

This first embodiment of the present invention has a speed of F/1.56 and provides a curved Fresnel type triplet having good control of both distortion and image quality. The effective diameter of each lens in this first embodiment is at least twenty times greater than the maximum thickness of the lens. The thickness of the lenses along the optical axis are only 0.09 inches as can be seen from the following Table 1.

In the design of the following lens system, the specific lens parameters were derived after a consideration of both optical image quality and economic factors. In the lens drawings of FIGS. 2 and 4 which support the specification and supplement the parameters of the lens system as set forth in the following Tables, the lenses in accordance with the present invention, are illustrated diagrammatically. As usual, in conventional lens diagrams, the axial spacings are measured from left to right with consecutive numbers. Additionally, the radius of curvatures are directional in the Tables in sequence from left to right. The symbols of axial spacings (both air spaces and lens thicknesses) and radius of curvatures have been omitted from the drawings for the sake of clarity in view of the ray traces which are believed to provide additional information to an optical designer skilled in this field.

In the Tables, the minus signs (−) indicate surfaces concave toward the left side of the drawings, while the surfaces without the sign are convex toward the left side. The Tables also disclose the axial spacings along the optical axis and include both the axial spacings between the lens elements and the thickness of the lens elements. The axial spacings between the lens elements are positioned accordingly, relative to the radii in the Tables while the thicknesses are designated accordingly, on the same line as the radii. The dimensions in the Tables are given in inches, however, it should be readily appreciated that the actual linear dimensions can be scaled to values with reference to an equivalent focal length of unity. The Tables also provide with respect to each example, the Abbe number and index of refraction. Finally, the Tables provide the aspheric constants for deriving the aspheric slope for the Fresnel facets along with the base radius, RB.

entrance pupil diameter is 8.5 inches with an exit pupil diameter of 7.8 inches. The clear aperture of the outer lens element, 12, is approximately 9.5 inches. Finally, the relative illumination at the corner of the screen due to vignetting of the lens barrel was approximately 47 percent. The lens barrel length, from vertex to vertex was approximately 11 inches and is positioned approximately 8.2 inches away from the surface of the image forming screen of the television set 4. The preferred plastic material was methacrylate, although other types of plastic could be used such as styrene for one or two lens elements with a slight redesign.

Figure 5:
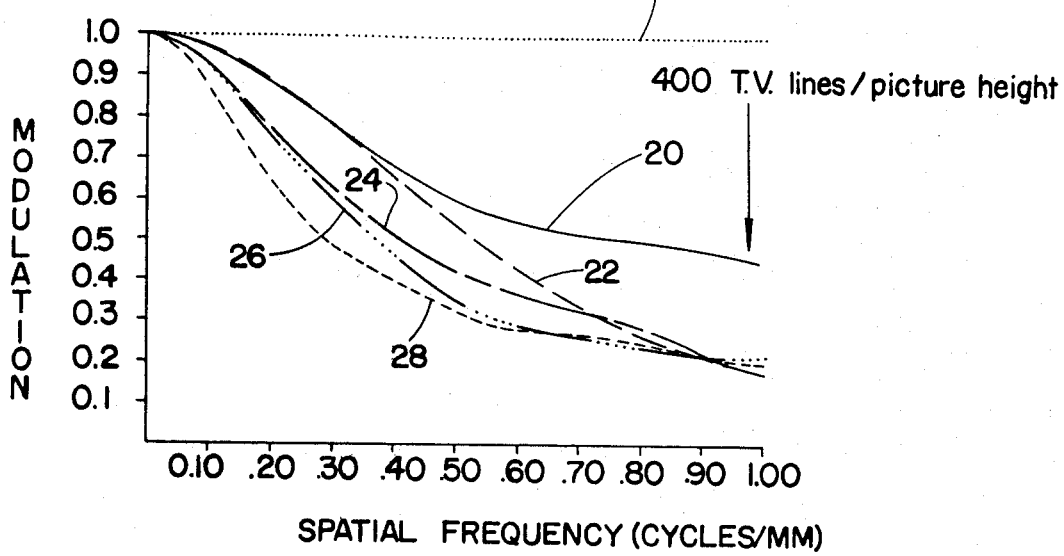
FIG. 5 is a graph of the geometrical MTF for the lens design of FIG. 2.

The geometrical MTF discloses a resolution capability across the field of approximately 400 T.V. lines per picture height and is set forth in FIG. 5. In calculating these MTF curves, a wavelength weight factor of 1 was assigned to wavelengths of 656.3 nm and 486.1 nm while a factor of 2 was assigned to a wavelength of 587.6 nm. In the MTF graph, the diffraction limit is disclosed as line 18 while the axis is disclosed as line 20. A tangential curve 24 and a sagittal curve 26 are set forth for a 0.6 field height (−13.49 degrees) and a tangential curve 22 and a sagittal curve 28 is set forth for a 1.0 field height (−22.40 degrees).

Figure 8:
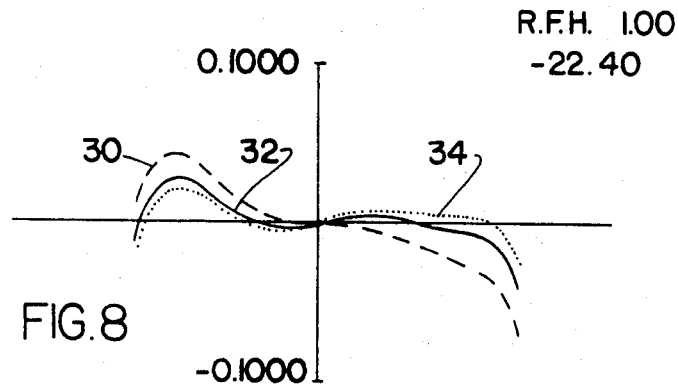
FIGS. 8 through 13 are the tangential and sagittal transverse aberration curves for the first embodiment of the present invention.
Figure 9:
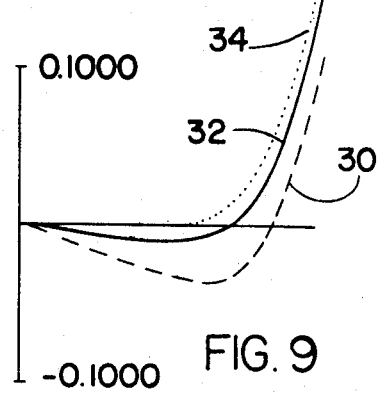
Figure 10:
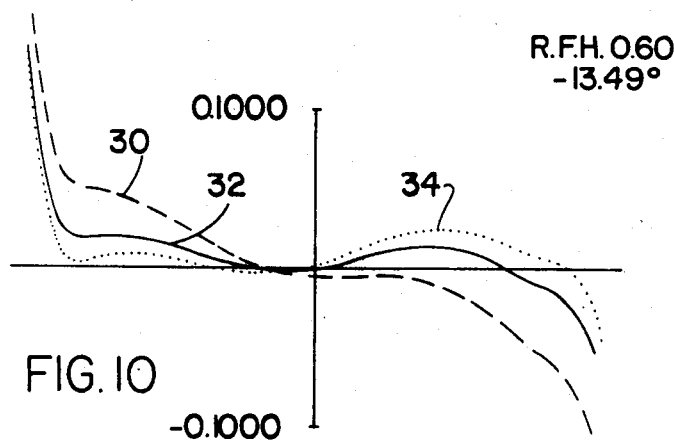
Figure 11:
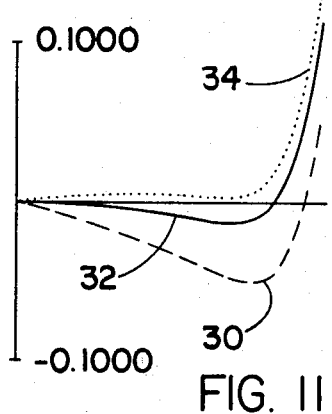
Figure 12:
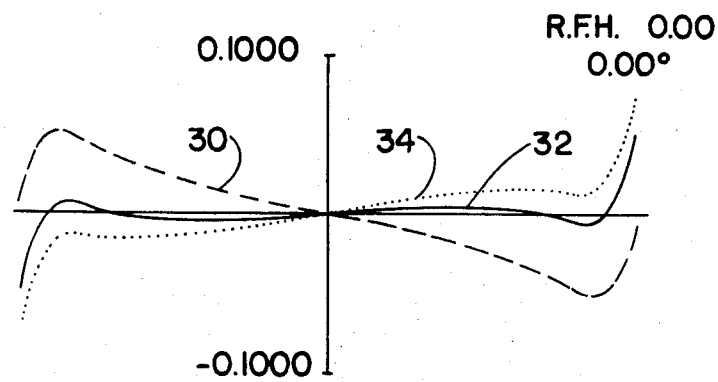
Figure 13:
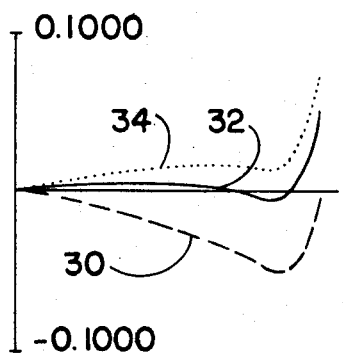
Figure 14:
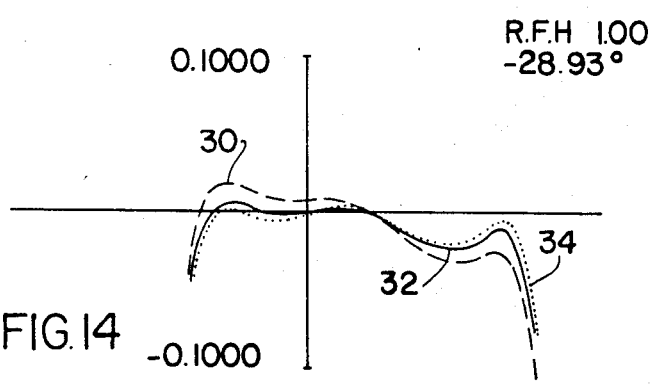
FIGS. 14 through 19 are the tangential and sagittal transverse aberration graphs for a second embodiment of the present invention.
Figure 15:
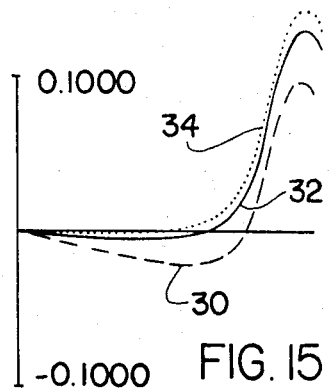
Figure 16:
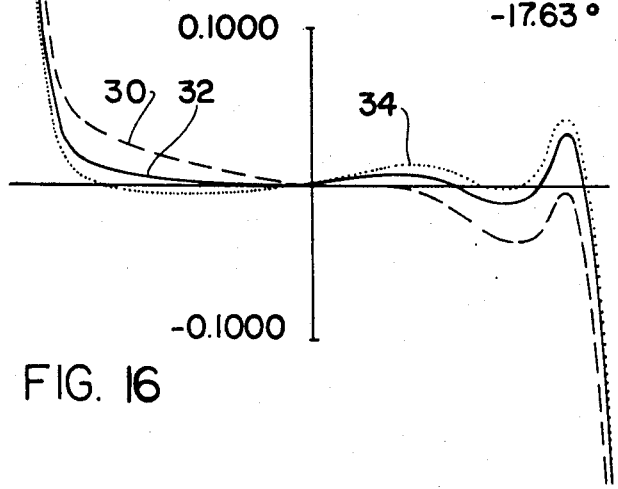
Figure 17:
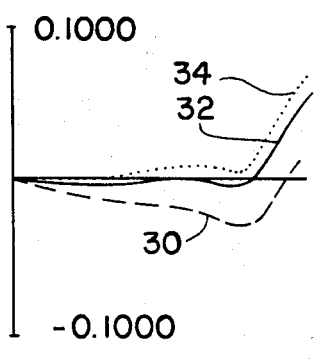
Figure 18:
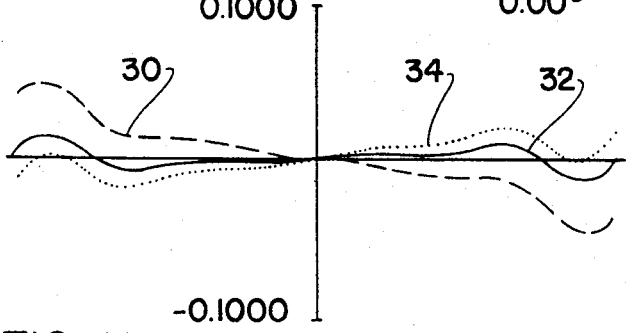
Figure 19:
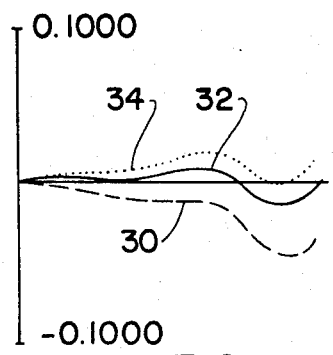
Figure 20:
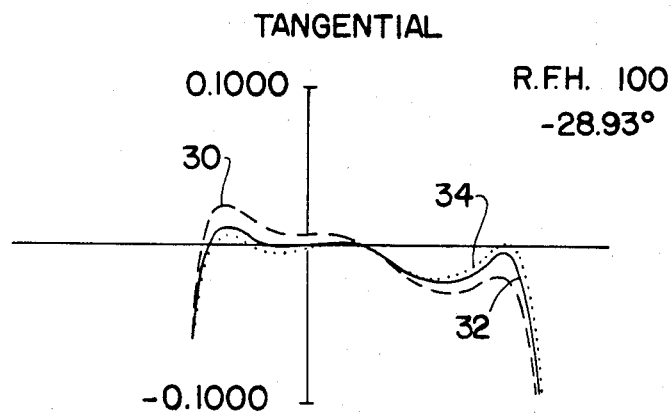
FIGS. 20 to 25 are the tangential and sagittal transverse aberration graphs for a third embodiment of the present invention disclosed in FIG. 4.
Figure 21:
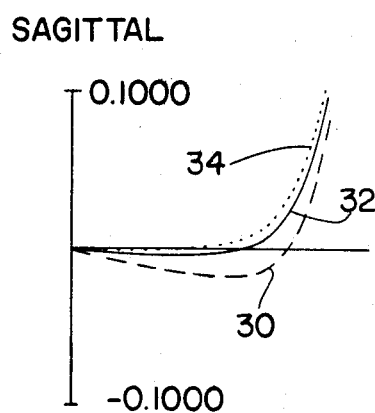
Figure 22:
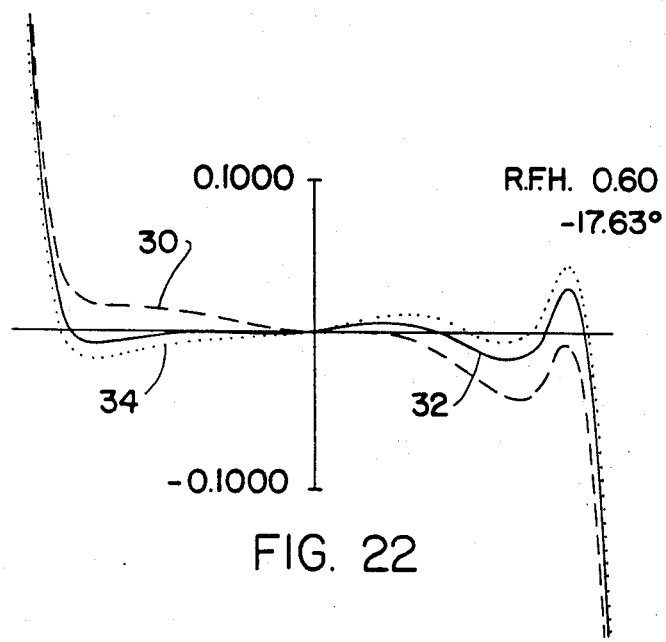
Figure 23:
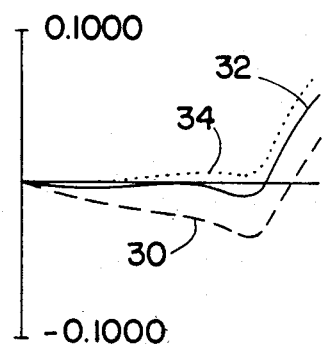
Figure 24:
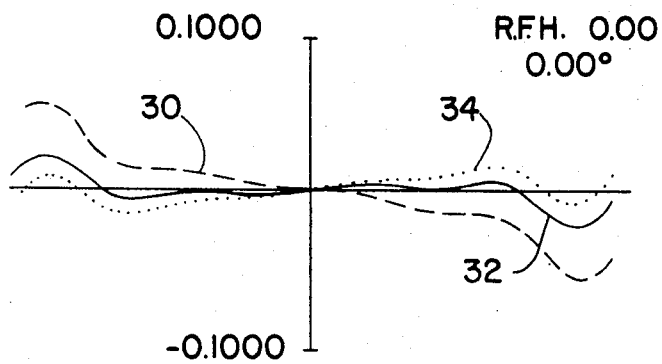
Figure 25:
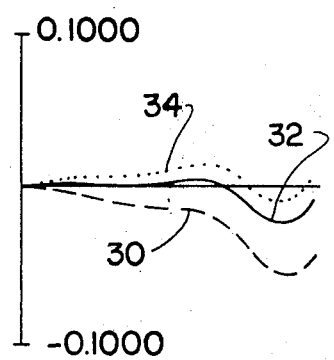

Three aberration graphs for respectively relative field heights of 1.00, 0.60 and 0.00 are set forth, for tangential aberrations in FIGS. 8, 10 and 12 and for the sagittal aberrations in FIGS. 9, 11 and 13 for the first embodiment. Curve 30 is for a wavelength of 486.1 nm while curve 32 is for a wavelength of 587.6 nm and curve 34 is for a wavelength of 658.3 nm. The same wavelength values are presented by the same form of curve in each of the aberration graphs. All aberrations in these graphs are scaled in inches.

A distortion of less than 0.2 inches was achieved on the projection screen. This distortion represents the maximum sag perceived from a viewing position near the lens for a projected straight line at the top of the T.V. screen. The relative illumination at the corner of the projection screen due to vignetting is approximately 47 percent.

TABLE 1

| ELEMENT | R1 | R2 | T | N/V |
|---|---|---|---|---|
| OBJECT DISTANCE | | | 73.5468 | |
| $L_1$ | A(1) $RB_1 = 16.474$ | 13.5990 | .0900 | 1.491/57.2 |
| | | | 4.9097 | |
| APERTURE STOP | | | | |
| | | | 4.6420 | |
| $L_2$ | A(2) $RB_2 = -3.784$ | −4.1397 | .0900 | 1.491/57.2 |
| | | | 1.1783 | |
| $L_3$ | A(3) $RB_3 = 34.846$ | 26.0000 | .0900 | 1.491/57.2 |
| IMAGE | | | 8.2004 | |

ASPHERIC CONSTANTS $$Z = \frac{(CURV)Y^2}{1 + (1 - (1 + K)(CURV)^2 Y^2)^{\frac{1}{2}}} + (A)Y^4 + (B)Y^6 + (C)Y^8 + (D)Y^{10}$$

| ASPHERIC CURVE | K | A | B |
|---|---|---|---|
| A(1) | .17086590 | 0.000000 | −3.65390E −4 | −2.22403E −5 |
| A(2) | −.07207025 | 0.000000 | −7.02038E −3 | +2.17572E −4 |
| A(3) | −.04295470 | 0.000000 | 5.87983E −3 | −3.05549E −4 |

| C | D |
|---|---|
| 6.51163E −7 | −2.70110E −8 |
| −5.84082E −6 | −6.19676E −7 |
| 9.46927E −6 | −1.24323E −7 |

In the first embodiment, the radius of the screen was assumed to be 129.87 inches with a total field angle of approximately 45 degrees. The back focal length is 8.2 inches with an effective focal length of 13.3 inches. The A second embodiment of the present invention is disclosed in the following Table 2. The relative shape of the lens elements are somewhat similar to that disclosed in FIG. 2 and accordingly, are not illustrated since it would appear to a large degree as a duplication of the lens schematic of FIG. 2.

TABLE 2

| ELEMENT | | R1 | R2 | T | N/V |
|---|---|---|---|---|---|
| OBJECT DISTANCE | | | | 57.4401 | |
| $L_1$ | A(1) | | 5.3957 | .0900 | 1.491/57.2 |
| | $RB_1 =$ 6.685 | | | 2.8223 | |
| | APERTURE STOP | | | | |
| | | | | 2.5535 | |
| $L_2$ | A(2) | | | | |
| | $RB_2 =$ | −2.6328 | −2.7674 | .0900 | 1.491/57.2 |
| | | | | .8591 | |
| $L_3$ | A(3) | | | | |
| | $RB_3 =$ | 21.744 | 13.2925 | .0900 | 1.491/57.2 |
| IMAGE | | | | 8.0552 | |

ASPHERIC CONSTANTS $$Z = \frac{(CURV)Y^2}{1 + (1 - (1 + K)(CURV)^2 Y^2)^{\frac{1}{2}}} + (A)Y^4 + (B)Y^6 + (C)Y^8 + (D)Y^{10}$$

| ASPHERIC | CURVATURE | K | A | B |
|---|---|---|---|---|
| A(1) | .28380247 | 0.000000 | −9.31229E −4 | −5.36759E −4 |
| A(2) | −.12935331 | 0.000000 | −1.85253E −2 | 7.55302E −4 |
| A(3) | −.03567578 | 0.000000 | 1.44629E −2 | −1.63779E −3 |

| C | D |
|---|---|
| 6.38404E −5 | −5.05445E −6 |
| 5.339075E −5 | −2.961245E −5 |
| 1.11646E −4 | −3.29334E −6 |

The second embodiment of the present invention has a speed of F/1.9 and again provides a meniscus Fresnel type triplet having good control of both distortion and image quality. As with the first embodiment, the thickness of the lenses along the optical axis are only 0.09 inches and the ratio of the lens diameter to maximum thickness is maintained at less than a factor of 20. The field angle has been increased to approximately 58 degrees and the back focal length is 8.06 inches with an effective focal length of 10.1 inches. The entrance pupil diameter is 5.3 inches with an exit pupil diameter of 5.2 inches. The clear aperture of the outer lens element, closest to the projection screen, is approximately 6.2 inches.

The relative illumination at the corner of the screen due to vignetting of the lens barrel is approximately 32 percent. The lens barrel length, from vertex to vertex is approximately 6.5 inches and is positioned approximately 8 inches away from the television screen. Again, the preferred plastic material is methacrylate although other types of plastic such as styrene can be used with a slight redesign.

Figure 6:
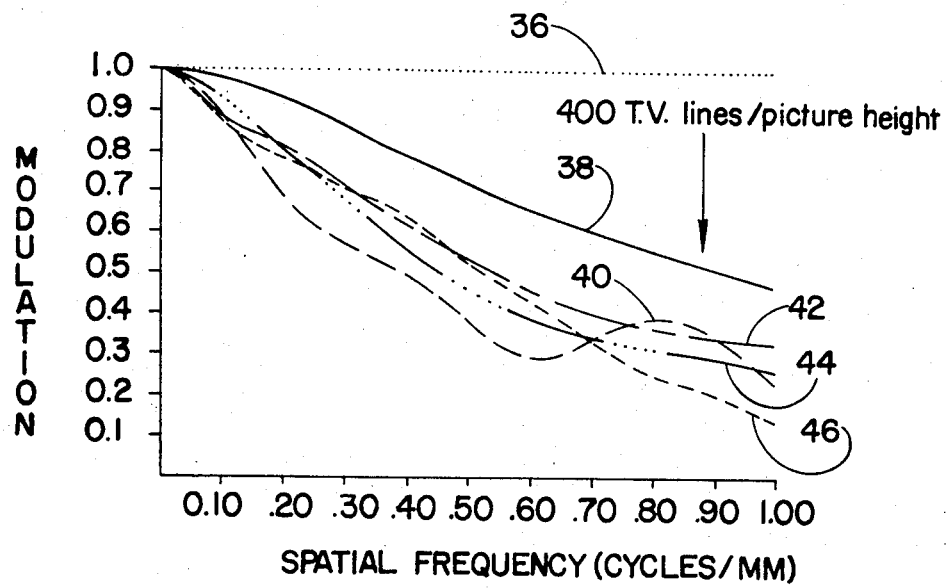
FIG. 6 is a geometrical MTF curve for the lens design of FIG. 4.

The geometrical MTF for the second embodiment is disclosed in FIG. 6 and is derived in a similar manner as was disclosed with respect to the first embodiment. In the MTF graph of FIG. 6, the diffraction limit is disclosed as line 36 while the axis is disclosed as line 38. A tangential curve 42 and a sagittal curve 44 are set forth for a 0.6 field height (−17.63 degrees) and a tangential curve 40 and a sagittal curve 46 is set forth for a 1.0 field height (−28.93 degrees).

Aberration graphs for respectively relative field heights of 1.00, 0.60 and 0.00 are set forth in FIGS. 14 to 19. Tangential aberrations are disclosed in FIGS. 14, 16 and 18 while sagittal aberrations are disclosed in FIGS. 15, 17 and 19. The graph symbols of each respective curves again corresponds to the same wavelengths defined per curves 30, 32 and 34 of FIG. 8.

Again, a distortion of less than 0.2 inches is achieved on the projection screen while the absolute illumination at the projection screen is less than for the first embodiment, it is still adequate if the ambient illumination at the projection screen has a relatively low light level. As can be readily appreciated the apparent image brightness is a function of the ambient illumination of the projection screen for each of the designs presented herein. That is the optimum results will be perceived by a viewer sitting adjacent the television in a relatively darkened room. In the second embodiment the relative illumination for a field of 0.6 was 77 percent.

Figure 4:
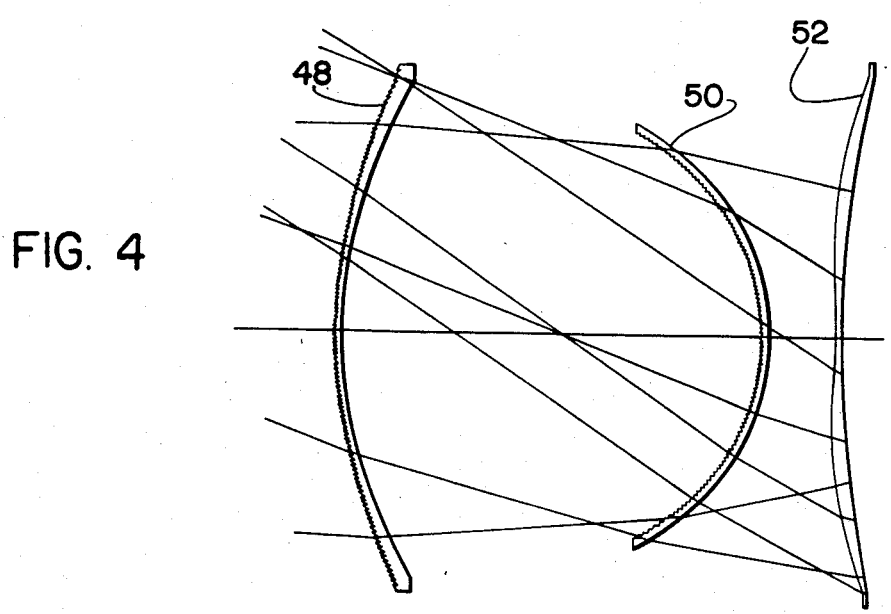
FIG. 4 is a schematic cross-sectional view of a second embodiment of the lens design with two Fresnel type surfaces.

A modified version of the second embodiment of the present invention is disclosed n FIG. 4. It is believed that this third embodiment is less difficult to fabricate than the second embodiment since the flattest aspheric Fresnel lens element has been redesigned as a classical aspheric lens element. As can be determined, the same maximum lens thickness parameters have been maintained in this third design.

A first thin meniscus lens element 48d is convex to the projection screen with a first surface having Fresnel type grooves with superimposed aspherical sloped facets on a non-flat base radius, RB. The right side of lens element 48 is smooth and can be coated with an anti-reflection coating. A second thin meniscus lens element 50 is concave to the left side of FIG. 4 and the left surface of lens element 50 has an aspherical Fresnel type surface. Finally, a third thin meniscus lens element 52 having a relatively weak power and convex to the left side completes the third embodiment. The left side of lens element 52 has a classical aspherical surface. The right side of each of the lens elements 48, 50 and 52 are smooth and spherical and could be coated with an anti-reflection material.

This third embodiment of the present invention has a speed of F/1.9 with a total field angle of approximately 58 degrees. Again, the effective diameter of each lens in this third embodiment is at least 20 times greater than the maximum thickness of the lens and the Fresnel base radius, RB, is in the range of 0.53 to 20 times the diameter of its respective optical element. The thickness of the lenses along the optical axis are only 0.09 inches. As with each of the lens designs presented herein the projection screen radius is assumed to be 130.0 inches. The back focal length is 8.05 inches with a focal length of a 10.1 inches. The entrance pupil diameter is 5.3 inches with an exit pupil diameter of 5.2 inches. The clear aperture of the outer lens element, 48, is approximately 6.4 inches. The relative illumination and distortion is approximately the same as the second embodiment. The specific parameters of this third embodiment is set forth in Table 3 as follows:

TABLE 3

| ELEMENT | | R1 | R2 | T | N/V |
|---|---|---|---|---|---|
| OBJECT DISTANCE | | | | 57.4401 | |
| | $L_1$ | A(1) | 5.3957 | 0.900 | 1.491/57.2 |
| | | $RB_1 = 6.685$ | | | |
| | | | | 2.8223 | |
| | | APERTURE STOP | | | |
| | | | | 2.5535 | |
| | $L_2$ | A(2) | −2.7674 | .0900 | 1.491/57.2 |
| | | $RB_2 = -2.6328$ | | | |
| | | | | .8591 | |
| | $L_3$ | A(3) | 13.2925 | .0900 | 1.491/57.2 |
| IMAGE | | | | 8.0534 | |

ASPHERIC CONSTANTS $$Z = \frac{(CURV)Y^2}{1 + (1 - (1 + K)(CURV)^2 Y^2)^{\frac{1}{2}}} + (A)Y^4 + (B)Y^6 + (C)Y^8 + (D)Y^{10}$$

| ASPHERIC | CURVATURE | K | A | B |
|---|---|---|---|---|
| A(1) | .28380247 | 0.000000 | −9.31229E −4 | −5.36759E −4 |
| A(2) | −.12935331 | 0.000000 | −1.85253E −2 | 7.55302E −4 |
| A(3) | −.03580302 | 0.000000 | 1.46732E −2 | −1.67730E −3 |

| C | D |
|---|---|
| 6.38404E −5 | −5.05445E −6 |
| 5.33907E −5 | −2.96124E −5 |
| 1.12721E −4 | −3.22124E −6 |

The geometrical MTF for the third embodiment is again derived in the same manner mentioned above with respect to the other MTF graphs is disclosed in FIG. 7. In the MTF graph of FIG. 7, the diffraction limit is disclosed as line 54 while the axis is disclosed as line 56. A tangential curve 58 and a sagittal curve 60 are set forth for a 0.6 field height (−17.63 degrees) and a tangential curve 62 and a sagittal curve 64 is set forth for a 1.0 field height (−28.93 degrees).

The aberration graphs for respectively relative field heights of 1.00, 0.60 and 0.00 are set forth in FIGS. 20 to 25. The tangential aberrations are set forth respectively in FIGS. 20, 22 and 24, while the sagittal aberrations are set forth in FIGS. 21, 23 and 25. Again, the symbols for the respective curves are consistent with the wavelengths designated in FIG. 8.

While the above examples provide the preferred embodiments of the present invention and it is believed that the third embodiment described above is the least expensive to manufacture, it should be readily apparent that these examples are simply illustrative of the broad principles of the present invention and are not to be construed as limiting. It is believed that the present invention discloses a unique application of a Fresnel type aspheric facet lens on a thin non-planar base that has not been heretofore provided in the optical field. Accordingly, the scope of the present invention should be determined solely from the following claims.

What is claimed is:

1. A high speed objective lens system capable of forming images that is particularly adaptable for a television projection system comprising from a viewing screen object side to a video image side on an optical axis;

a first thin meniscus lens element convex to the object side having a curvilinear configuration on one side and a Fresnel type surface on the other side;
a second thin meniscus lens element concave to the object side having a curvilinear configuration on one side and a Fresnel type surface on the other side, and
a third weak thin aspherical meniscus lens element convex to the object side.

2. The invention of claim 1 wherein each of the Fresnel surfaces have a locus of median points of their respective step facets that form a nonplanar configuration.

3. The invention of claim 1 wherein the object side of the third lens includes an aspherical surface.

4. The invention of claim 1 wherein the third lens has one surface having a curvilinear configuration on one side and a Fresnel type surface on the other side.

5. The invention of claim 1 wherein the effective diameter of each lens is at least twenty times greater than its maximum thickness.

6. The invention of claim 1 wherein the slopes of step facets forming the Fresnel surfaces are aspherical.

7. The invention of claim 1 wherein each lens element has the same thickness on the optical axis.

8. The invention of claim 1 wherein each lens is formed from a plastic material.

9. The invention of claim 8 wherein each lens is formed from an acrylic plastic.

10. The invention of claim 1 wherein the speed of the lens system is greater than or equal to F/1.9.

11. In a video projection system having a projection screen and an image forming surface, the improvement comprising;

a high speed objective projection lens assembly operatively positioned relative to the image forming surface for projecting the images onto the screen including a first thin meniscus lens element convex to the projection screen, a second thin meniscus lens element concave to the projection screen, and a third thin lens element, at least one surface on each of two lens elements have a Fresnel type surface, the locus of median points of respective step facets of each Fresnel type surface forming a nonplanar configuration.

12. The invention of claim 11 wherein the slopes of the step facets of the Fresnel surface are aspherical.

13. The invention of claim 11 wherein each of the meniscus lens elements have one aspherical Fresnel facet surface.

14. The invention of claim 11 wherein the effective diameter of each lens is at least twenty times greater than its maximum thickness.

15. The invention of claim 11 wherein each lens element has the same thickness on the optical axis.

16. The invention of claim 11 wherein each lens is formed from a plastic material.

17. The invention of claim 11 wherein the speed of the lens system is greater than or equal to F/1.9.

18. The invention of claim 16 wherein each lens is formed from an acrylic plastic.

19. A high speed plastic objective lens system comprising from image to object side;
   a first thin meniscus lens element convex to the image side;
   a second thin meniscus lens element concave to the image side;
   a third thin lens element, at least one surface on each of two lens elements have a Fresnel surface, the locus of median points of respective step facets of each Fresnel surface forming a nonplanar configuration.

20. The invention of claim 19 wherein the locus of median points traces a cross-sectional circular path.

21. The invention of claim 19 wherein the slopes of step facets forming each Fresnel surface is aspherical.

22. The invention of claim 19 wherein the lens element is molded from a plastic material.

23. The invention of claim 19 wherein the object side surface of the third lens element is convex to the image side.

24. The invention of claim 19 wherein the effective diameter of each lens is at least twenty times greater than its maximum thickness.

25. The invention of claim 24 wherein each Fresnel refracting surface is aspherical.

26. The invention of claim 25 wherein at least one refracting surface on each lens element is aspherical.

27. The invention of claim 25 wherein the speed of the lens system is at least F/1.9.

28. The invention of claim 25 wherein the locus of median points has a base radius, RB, which is within a range of 0.53 to 20 times the diameter of the lens elements with the Fresnel refracting surface.

29. A high speed plastic objective lens system comprising the following design parameters;

| ELEMENT | R1 | R2 | T | N/V |
|---|---|---|---|---|
| OBJECT DISTANCE | | | 57.4401 | |
| $L_1$ | A(1) | 5.3957 | 0.900 | 1.491/57.2 |
| | $RB_1 = 6.685$ | | | |
| | | | 2.8223 | |
| APERTURE STOP | | | | |
| | | | 2.5535 | |
| $L_2$ | A(2) | | | |
| | $RB_2 = -2.6328$ | −2.7674 | .0900 | 1.491/57.2 |
| | | | .8591 | |
| $L_3$ | A(3) | | | |
| | $RB_3 = 21.744$ | 13.2925 | .0900 | 1.491/57.2 |
| IMAGE | | | 8.0552 | |

ASPHERIC CONSTANTS $$Z = \frac{(CURV)Y^2}{1 + (1 - (1 + K)(CURV)^2 Y^2)^{\frac{1}{2}}} + (A)Y^4 + (B)Y^6 + (C)Y^8 + (D)Y^{10}$$

| ASPHERIC | CURVATURE | K | A | B |
|---|---|---|---|---|
| A(1) | .28380247 | 0.000000 | −9.31229E −4 | −5.36759E −4 |
| A(2) | −.12935331 | 0.000000 | −1.85253E −2 | 7.55302E −4 |
| A(3) | −.03567578 | 0.000000 | 1.44629E −2 | −1.63779E −3 |

| C | D |
|---|---|
| 6.38404E −5 | −5.05445E −6 |
| 5.339075E −5 | −2.961245E −5 |
| 1.11646E −4 | −3.29334E −6 |

30. A high speed plastic objective lens system comprising the following design parameters;

| ELEMENT | R1 | R2 | T | N/V |
|---|---|---|---|---|
| OBJECT DISTANCE | | | 57.4401 | |
| $L_1$ | A(1) | 5.3957 | 0.900 | 1.491/57.2 |
| | $RB_1 = 6.685$ | | | |
| | | | 2.8223 | |
| APERTURE STOP | | | | |
| | | | 2.5535 | |
| $L_2$ | A(2) | | | |
| | $RB_2 = -2.6328$ | −2.7674 | .0900 | 1.491/51.2 |
| | | | .8591 | |
| $L_3$ | A(3) | | | |
| | $RB_3 = 21.744$ | 13.2925 | .0900 | 1.491/57.2 |
| IMAGE | | | 8.0552 | |

ASPHERIC CONSTANTS $$Z = \frac{(CURV)Y^2}{1 + (1 - (1 + K)(CURV)^2 Y^2)^{\frac{1}{2}}} + (A)Y^4 + (B)Y^6 + (C)Y^8 + (D)Y^{10}$$

-continued

| ASPHERIC | CURVATURE | K | A | B |
|---|---|---|---|---|
| A(1) | .28380247 | 0.000000 | −9.31229E −4 | −5.36759E −4 |
| A(2) | −.12935331 | 0.000000 | −1.85253E −2 | 7.55302E −4 |
| A(3) | −.03580302 | 0.000000 | 1.46732E −2 | −1.67730E −3 |

| C | D |
|---|---|
| 6.38404E −5 | −5.05445E −6 |
| 5.33907E −5 | −2.96124E −5 |
| 1.12721E −4 | −3.22124E −6 |

31. A high speed plastic objective lens system comprising the following design parameters;

| ELEMENT | R1 | | R2 | T | N/V |
|---|---|---|---|---|---|
| OBJECT DISTANCE | | | | 73.5468 | |
| $L_1$ | A(1) | | 13.5990 | 0.900 | 1.491/57.2 |
| | $RB_1 =$ 16.474 | | | | |
| | | | | 4.9097 | |
| | APERTURE STOP | | | | |
| | | | | 4.6420 | |
| $L_2$ | A(2) | | −4.1397 | .0900 | 1.491/57.2 |
| | $RB_2 =$ −3.784 | | | | |
| $L_3$ | A(3) | | 26.0000 | 1.1783 .0900 | 1.491/57.2 |
| | $RB_3 =$ 34.846 | | | | |
| IMAGE | | | | 8.2004 | |

ASPHERIC CONSTANTS $$Z = \frac{(CURV)Y^2}{1 + (1 - (1 + K)(CURV)^2 Y^2)^{\frac{1}{2}}} + (A)Y^4 + (B)Y^6 + (C)Y^8 + (D)Y^{10}$$

| ASPHERIC | CURVATURE | K | A | B |
|---|---|---|---|---|
| A(1) | .17086590 | 0.000000 | −3.65390E −4 | −2.22403E −5 |
| A(2) | −.07207025 | 0.000000 | −7.02038E −3 | +2.17572E −4 |
| A(3) | −.04295470 | 0.000000 | 5.87983E −3 | −3.05549E −4 |

| C | D |
|---|---|
| 6.51163E −7 | −2.70110E −8 |
| −5.84082E −6 | −6.19676E −7 |
| 9.46927E −6 | −1.24323E −7 |

* * * * *